United States Patent [19]

Kato et al.

[11] Patent Number: 4,984,092
[45] Date of Patent: Jan. 8, 1991

[54] HALFTONE IMAGE GRADATION DATA CONVERTED TO BIT-TRAIN DATA WITH DATA RETAINED AFTER THRESHOLDING CONVERTED TO PULSE-TRAIN DATA

[75] Inventors: Nobuhisa Kato; Fujio Moriguchi, both of Iwatsuki, Japan

[73] Assignee: Fuji Xerox Co., Ltd., Tokyo, Japan

[21] Appl. No.: 336,209

[22] Filed: Apr. 11, 1989

[30] Foreign Application Priority Data

May 24, 1988 [JP] Japan .................................. 63-126286

[51] Int. Cl.$^5$ ...................... H04N 1/23; G01D 15/10; B41J 2/315
[52] U.S. Cl. ................................. 358/298; 346/76 PH
[58] Field of Search .................... 346/76 PH; 358/298, 358/454–461

[56] References Cited

U.S. PATENT DOCUMENTS

| | | | |
|---|---|---|---|
| 4,368,491 | 1/1983 | Saito | 358/298 |
| 4,774,528 | 9/1988 | Kato | 364/519 |
| 4,777,536 | 10/1988 | Kato | 358/298 |

Primary Examiner—Bruce A. Reynolds
Assistant Examiner—Scott A. Rogers
Attorney, Agent, or Firm—Spensley Horn Jubas & Lubitz

[57] ABSTRACT

In an image recording apparatus capable of recording a halftone image, a gradation to bit-train converting table converts gradation data representing a gradation of tone at a picture element of an image into bit-train data whose bit pattern is based on the gradation data. For the gradation data representing a gradation in excess of a threshold gradation, the table converts the gradation data into such bit-train data that bits of the bit-train data corresponding to the gradation data are intermittently omitted after a train of bits corresponding to the threshold gradation is outputted. A bit-train to pulse-train converting section converts the bit-train derived from the gradation to bit-train converting table into pulse-train signal of a pulse pattern analogous to that of the bit-train data. The pulse signal of such a discontinuous pulse pattern is applied to a heating element of a thermal head, which is provided corresponding to the picture element whose gradation data is under process. A heating temperature of the heating element is controlled below a predetermined temperature.

15 Claims, 10 Drawing Sheets

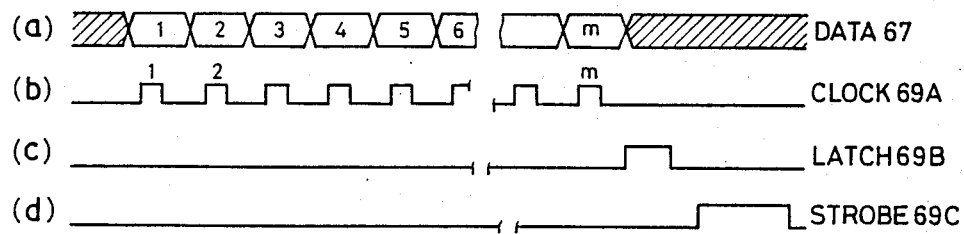
FIG. 5
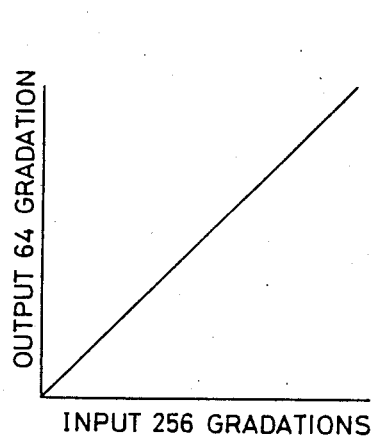
FIG. 6
FIG. 7

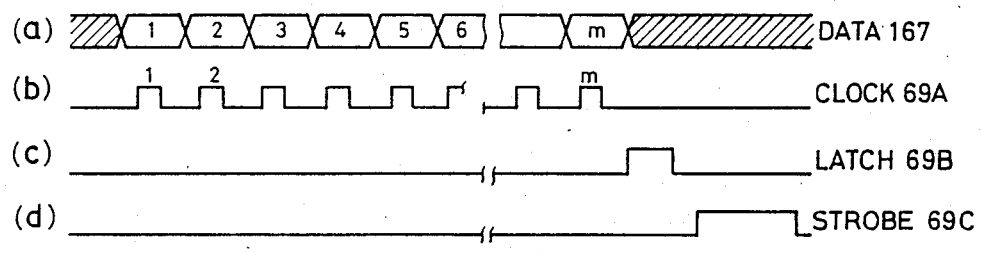
FIG.14
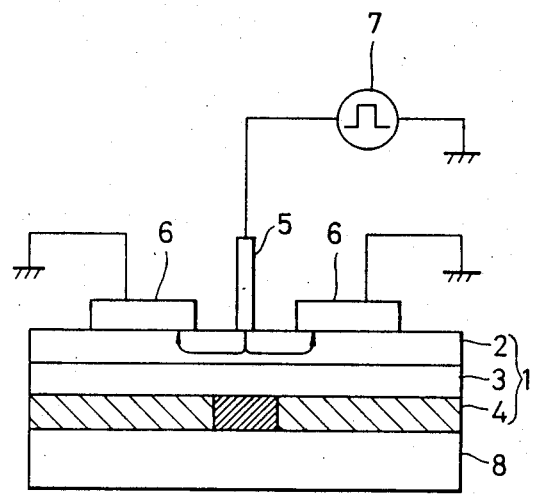
FIG.15
FIG.16 (PRIOR ART)

HALFTONE IMAGE GRADATION DATA CONVERTED TO BIT-TRAIN DATA WITH DATA RETAINED AFTER THRESHOLDING CONVERTED TO PULSE-TRAIN DATA

BACKGROUND OF THE INVENTION

The present invention relates to an image recording apparatus capable of recording an image of half-tone, and more particularly to an image recording apparatus capable of controlling a gray level of an image for each dot, i.e., each picture element, by using a thermal head, for example.

An image recording apparatus for recording image data by using a thermal head in which heat is selectively generated in the thermal head and characters are printed without any impact on a recording paper by making use of the selectively generated heat. The image recording apparatus of the nonimpact type can print an image quietly, while noisy printing is unavoidable in the image recording apparatus of the impact type in which characters are printed on a recording paper by mechanical impact. Further, the image recording apparatus using a thermal head is superior to the other nonimpact type image recording apparatuses, such as an ink jet printer and laser printer, in that the former may be manufactured with smaller size and lower cost.

In the image recording apparatus using a thermal head, heat energy of each heating element contained in the thermal head may be varied. Therefore, if heat sensitive recording paper is used, such as a recording paper of the heat color-developing type, an electrically heating sheet, and the like, a gray level of a recorded image can be controlled for each dot.

FIG. 16 shows a structural representation of an image recording apparatus using an electrically heating sheet as the recording medium. The electrically heating sheet 1 is made up of a resistor layer 2, a support layer 3, and a heat-melting ink layer 4. The support layer 3 supports the ink layer 4 for the resistor layer 2. The support layer 3 may double as the resistor layer 2, if necessary.

In operation, a record electrode 5 and a common electrode 6 are made to contact with the resistor layer 2 of the electrically heating sheet 1. A voltage of a pulse width corresponding to a record pattern is generated by a signal voltage generator 7, and is applied to the record electrode 5. The applied voltage causes a current to flow from the record electrode 5 through the resistor layer 2 to the common electrode 6. Generation of Joul heat by the current occurs right under the needle-like record electrode 5. The generated Joul heat transfers through the support layer 3, reaches the heat melting ink layer 4 to melt the ink contained therein, and the molten ink is transferred onto a recording paper 8.

If a heat value of a heating pulse is varied by changing a duration of the pulsative voltage applied to the electrode 5, a molten area of the ink of the layer 4 varies proportionally to the heat value of the applied heat energy. In other words, a diameter of each print dot may be changed by varying a time width of a pulse applied to each record electrode. In the sublimation type heat transfer, which uses an ink doner film with a sublimation ink coated surface, an amount of transferred ink is controllable in accordance with an applied heat energy. Thus, the image recording apparatus described above may record an image on a recording paper with discrete gradations in gray level controlled for each dot.

The applicant in the present patent application proposed an image recording apparatus based on the above principle. The apparatus is capable of recording a desired halftone image by controlling an accumulative time of the pulse applied to each heating element of a thermal head in accordance with a desired gradation of tone.

FIG. 17 shows a schematic illustration of the proposed image recording apparatus. As shown, gradation data 21 representing a gradation of one picture element (pixel) is inputted to a gradation to bit-train converting table 22.

This converting table 22 is realized by a read only memory (ROM), for example. A bit train consisting of consecutive "1's", which expresses the gradation data 21, is prestored in the storage location of an address assigned to the data 21 in the ROM. More specifically, when it is assumed that a tone can be expressed in terms of eight gradations, the data of the 8th gradation, which is highest in the tone, consists of eight consecutive "1's" bits "11111111". Such data is stored in the storage location of an address assigned to the data. Likewise the 7th gradation data is expressed by seven consecutive "1's" and one "0", "11111110".

The data signal of 8-bit long are transferred in parallel and inputted to a bit-train to pulse-train converting means 23. The converting means 23 converts the 8-bit data into a pulse signal corresponding to the number of "1's", and applies the converted pulse signal to a corresponding heating element 24, which is provided corresponding to the pixel whose gradation data is under process. Therefore, a value of heat generated by the heating element 24 is controlled in accordance with the gradation data 21, so that the pixel thus recorded on the recording paper has halftone.

The above recording apparatus is advantageous in that a tone can be set at any desired gradation by merely changing the contents in the gradation to bit-train converting table, and the resultant halftone image is high in quality. It has a disadvantage given below, however. The number of heating pulses to the heating element 24 is selected to be proportional to the number of gradations indicated by the gradation data 21. Therefore, when an image in high gray levels, or of black is recorded, the heat color developing sheet used would be thermally deformed. A deformation of the sheet provides poor contact or noncontact of the sheet with a recording paper, which is moving during the recording operation. This creates serious problems, such as partial blur or omission in the resultant image.

SUMMARY OF THE INVENTION

Accordingly, an object of the present invention is to provide an image recording apparatus which records an image, even if its gray level is high, without any partial blur or omission in the image.

Another object of the present invention is to provide an image recording apparatus in which a train of heating pulses making up gradation data to be applied to a heating element may be intermittently omitted.

Yet another object of the present invention is to provide an image recording apparatus which is free from a deformation of a heat color-developing sheet as recording medium.

To realize these objects, in an image recording apparatus according to the present invention, a gradation of each pixel is converted into a corresponding bit train. For the conversion, a gradation to bit-train converting table is used, which stores gradation data each consisting of a bit train patterned depending on a gray level of a print dot as a pixel. When the recording apparatus receives gradation data indicating a gradation exceeding a predetermined gradation (threshold gradation), a train of bits making up the gradation data are intermittently omitted, viz., a bit pattern of the data is made discontinuous subsequent to the outputting of a bit train indicating the predetermined gradation. A thermal head, receiving the gradation data of such a discontinuous bit pattern, produces a pulse train whose pulse pattern is analogous to that including the discontinuous bit pattern, and applies such pulses to a corresponding heating element. Upon receipt of the pulse signal, the heating element is placed in a heating condition. During the period lack of pulses, it is alternately placed in a natural heat radiating state and a heating state, so that a temperature rise of the heating element is held back.

Further objects, features and advantages of the present invention will be apparent from the following description given in connection with the accompanying drawings, in which:

BRIEF DESCRIPTION OF THE DRAWINGS

FIG. 5 shows a timing chart useful in explaining the operation of the thermal head;

FIG. 6 is a graph showing a relationship between output gradation to input gradation, which is useful in explaining the input to output gradation conversion;

FIG. 7 is a diagram showing the contents of the gradation to bit-train converting table;

FIG. 14 shows a timing chart useful in explaining the operation of the thermal head;

FIG. 15 shows a relationship between stored data and address in ROM;

FIG. 16 is an essential configuration of a device for recording a halftone image by controlling an amount of heat energy.

DETAILED DESCRIPTION OF THE PREFERRED EMBODIMENTS

Figure 1:
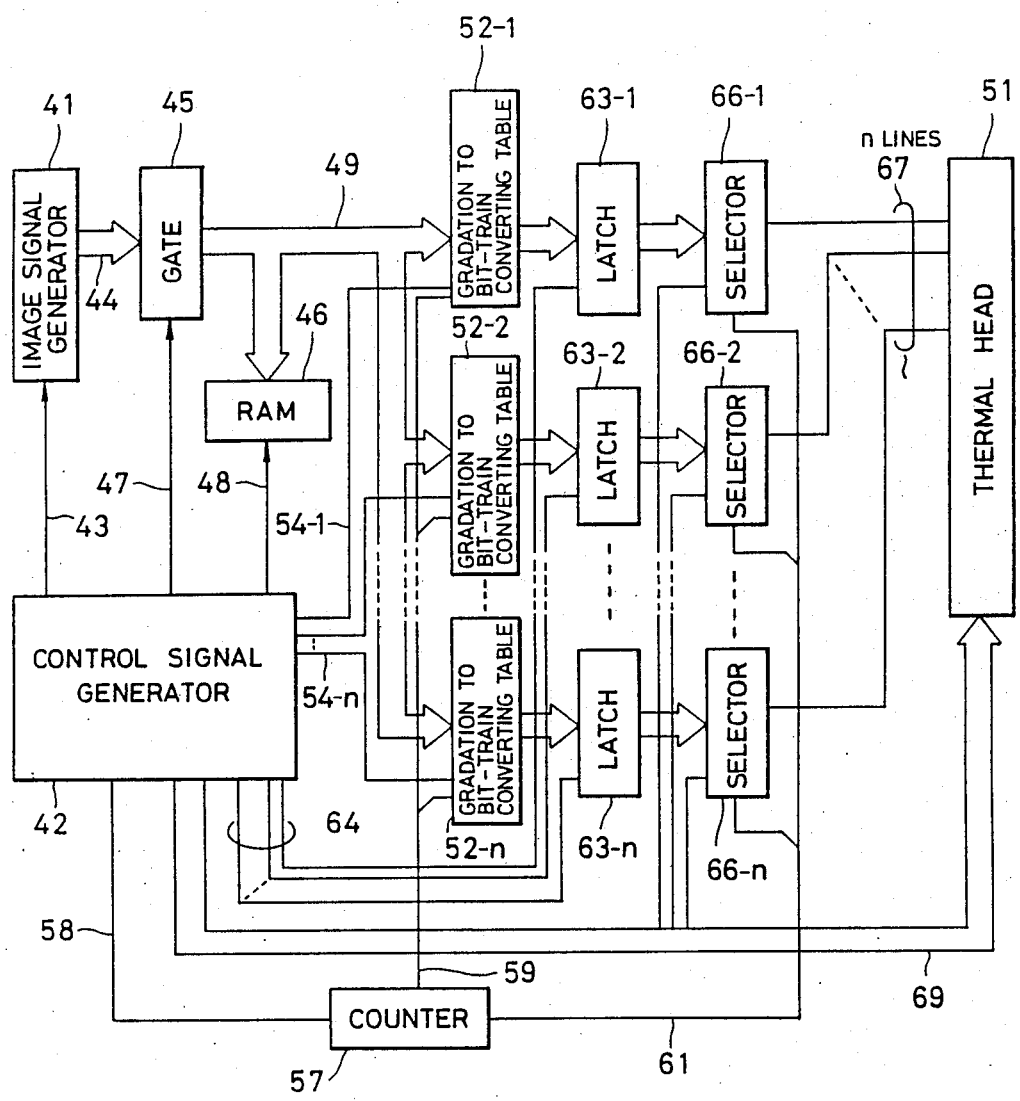
FIG. 1 is a block diagram showing an embodiment of an image recording apparatus according to the present invention.

FIG. 1 is a block diagram showing an embodiment of an image recording apparatus according to the present invention. In the figure, an image data signal generator 41 generates an image signal to reproduce an original image. More exactly, it generates gradation data signal 44 representing a gradation in gray level of each picture element, in response to a control signal 43 supplied from a control signal generator 42. The gradation data 44 consists of 8 bits, for example. In this instance, a tone of each picture element is expressed by a maximum of 256 gradations. The gradation data 44 is transferred through a gate 45, for example, a tristate gate, and is written into a RAM (random access memory) 46 for each raster. The gate 45 is controlled by a control signal 47, and the RAM 46, by a control signal 48.

The gradation data of one raster, which corresponds to a total number of heating elements of a thermal head 51 to be given later, are stored as one recording unit of data, in the RAM 46. After the gradation data of one raster have been written into the RAM 46, gradation data 49 of one raster are read out every picture element in successive order, in response to the control signal 48. The read operation of the gradation data is repeated a predetermined number of times. In this case, the gradation data 49 is read out with the number of the splitted outputs being equal to that of the data input lines of the shift registers contained in the thermal head 51 (see FIG. 4).

It is assumed now that the thermal head 51 contains "n" ("n" is a positive integer) shift registers and may receive "n" different data in parallel. On the assumption, "n" different gradation data 49 are respectively transferred through "n" data transfer lines to "n" gradation to bit-train converting tables 52-1 to 52-n. Table select signals 54-1 to 54-n from the control signal generator 42, respectively, determine the routes of those individual gradation data to the gradation to bit-train converting tables 52-1 to 52-n.

In each of those gradation to bit-train converting tables 52-1 to 52-n as selected by the table select signals 54-1 to 54-n, the gradation data 49 and output data 59 of a counter 57 are used as address signals, and specify storage locations of the tables in which gradation data each consisting of a bit train whose pattern represents the gradation of a corresponding address signal or item of the gradation data 49. The bit patterns of the data read out of the storage locations of the tables, respectively, determine the amounts of thermal energy generated by corresponding heating elements of the thermal head (in those tables, the gradation data are converted into bit trains patterned in accordance with the gradations of the data).

Figure 2:
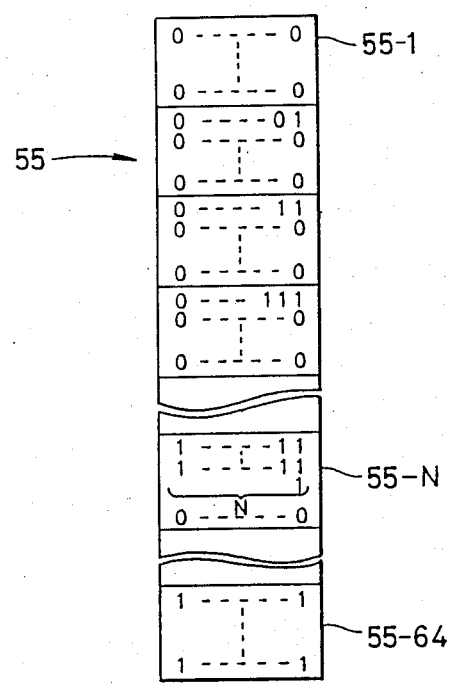
FIG. 2 shows a layout of data in a gradation to bit-train converting table used in the circuit arrangement of FIG. 1.

FIG. 2 shows a configuration of one of the gradation to bit-train converting tables 52-1 to 52-n shown in FIG. 1. Since those tables have the same configurations, one of them is typically illustrated and will be explained here in details. The gradation to bit-train converting table contains many gradation tables 55. The number of the gradation tables contained therein is equal to that of gradations of tone used. In this instance, 64 gradations are used for expressing a gray level or a tone of one print dot. The gradation data 49 as input data to the image recording apparatus contain the tonal information of 64 gradations. Accordingly, one gradation to bit-train converting table consists of 64 gradation tables 55-1 to 55-64.

Figure 3:
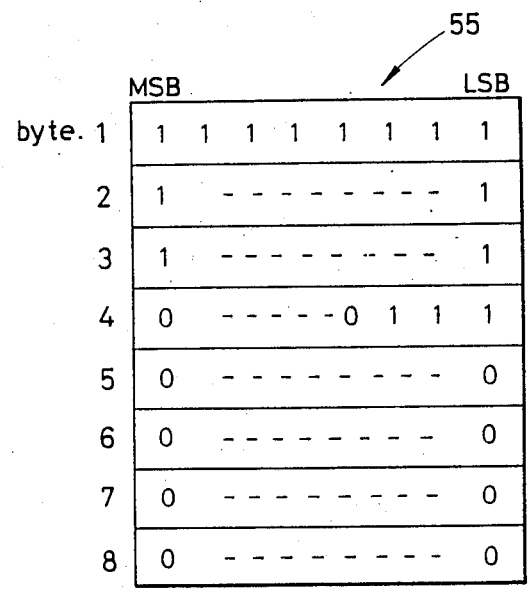
FIG. 3 shows a layout of data in one of gradation tables which are provided for each gradation in the gradation to bit-train converting table shown in FIG. 2.

As shown in FIG. 3, the gradation table 55 (generally designates those 55-1 to 55-64) contains the data of 8 bytes, i.e., a total of 64 bits, by which 64 gradations are expressed. In this instance, in the first to third bytes "byte 1" to "byte 3", the bits contained are all "1's". In the fourth byte "byte 4", three successive bits including LSB are "1's", while the remaining bits are "0's". The bits of the remaining bytes "byte 5" to "byte 8" are all "0's". This gradation table containing 27 bits of "1" indicates the 27th gradation, which corresponds to the number of "1" bits, 27.

Referring to FIG. 2 again, all of the 64 bits of the gradation data stored in the 1st gradation table 55-1 are "0's". Such a bit pattern indicates the 1st gradation (i.e., the highest gray level). In the Nth gradation table 55-N (N is a positive integer of 64 or smaller), N bits are all "1's" while the remaining bits are "0's", and such a bit pattern indicates the Nth gradation. The final gradation table 55-64 stores the 64-bit data of all "1's". This gradation data indicates the 64th gradation (the highest gray level).

Returning to FIG. 1, we proceeds with a further description of the hardware configuration of the image recording apparatus according to the present invention. In FIG. 1, the counter 57 is coupled with the control signal generator 42 by way of a signal line 58. By way of the signal line 58, the counter 57 receives a clock signal and a reset signal from the control signal generator 42 and transfers a signal such as a carry signal to the same. The count data outputted from the counter 57 consists of two parts; one consisting of the upper order bits as represented by the signal 59 and the other, the lower order bits as by a signal 61. The upper order data signal 59 is applied to the gradation to bit-train converting tables 52-1 to 52-n as mentioned above, while the lower order data signal 61, to selectors 66-1 to 66-n to be described later.

In the gradation to bit-train converting tables 52-1 to 52-n as selected by the table select signals 54-1 to 54-n, a table area in the gradation table 55, such as byte 1, byte 2, and so fourth, is designated by a numerical value of the upper order signal 59. For example, when the gradation data has addressed the gradation table 55 shown in FIG. 3, and a numerical value of the upper order signal 59 is "1", the first byte "byte 1" (FIG. 3) is designated. Then, the data of the "byte 1" (all the 8 bits are "1") is read out from the storage location and is outputted from the gradation to bit-train converting table 52. After the first byte is outputted, the upper order signal 59 is incremented to "2". This figure addresses the second byte "byte 2", so that the data of the second byte is read out. Subsequently, a similar sequence of read operation is repeated for reading out the remaining byte data, "byte 3" to "byte 8".

In this way, the "n" gradation to bit-train converting tables 52-1 to 52-n produce bit-train signals whose bit patterns correspond to the gradations of the gradation data 49. Those bit-train signals produced from the tables are latched in latch circuits 63-1 to 63-n. Control signals 64 generated by the control signal generator 42 are applied to those latch circuits 63-1 to 63-n and properly times the latching operation of the bit-train signal from the gradation to bit-train converting tables 52-1 to 52-n in those latch circuits.

The bit-train data latched in the latch circuits 63-1 to 63-n are read out and transferred to the selectors 66-1 to 66-n, respectively.

The lower order signal 61 has been supplied to the selectors 66-1 to 66-n, from the counter 57. By the signal 61, the selectors, respectively, select the bit-train data signals each serially coming in bit by bit, and transfer the data as selected data 67 to the thermal head 51. Since the selectors 66-1 to 66-n output the selected data 67 in parallel, the data 67 are serially inputted bit by bit into "n" shift registers 68-1 to 68-n, which are provided in the thermal head 51, as already described.

Figure 4:
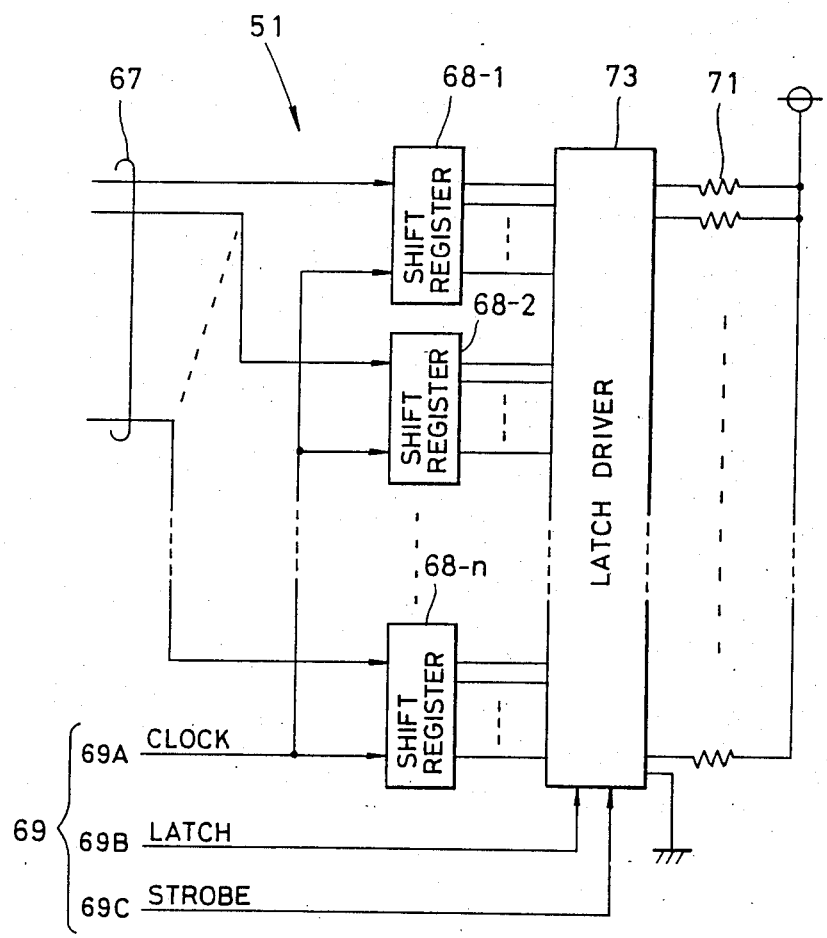
FIG. 4 shows a schematic representation of a thermal head.

A specific detailed configuration of the thermal head is as shown in FIG. 4. A timing chart useful in explaining the operation of the thermal head 51 is shown in FIG. 5. As shown in FIG. 4, the "n" shift registers 68-1 to 68-n respectively provided for different signal routes are installed in the thermal head 51. The selected data 67 are supplied through the signal routes to those shift registers (FIG. 5(a)). Of a group of control signals 69 generated by the control signal generator 42, a clock signal 69A (FIG. 5(b)) is applied to the shift registers 68-1 to 68-n. In response to the clock signal 69A, the shift registers operate each to serially receive and shift the selected data 67 (FIG. 5(a)) bit by bit. Finally, the selected data are set in the shift registers 68-1 to 68-n. In this case, the data "m" set in the shift registers is given by 1/n where "1" (=a positive integer) is a total number of heating elements 71 of the thermal head 51, and "n" is the number of the signal routes. Then, each of the shift registers outputs the serially received data in a parallel fashion, and applies them into a latch driver 73.

The latch driver 73 latches the received data in response to a latch signal 69B (FIG. 5(c) of the control signal group 69, and controls a current passage of each heating element 71 by a time width as determined by a strobe signal 69C (FIG. 5(d). More specifically, a current is fed to the heating element 71 only during periods of "1's" bits in the selected data 67 whose durations are determined by the strobe signal. Thus, the selected data is converted into a corresponding amount of electrical energy, and then heat energy.

In this way, the heat energy of one unit or each picture element is controlled, and the data in the latch driver 73 is replaced 64 times, followed by similar operations. Finally, the selected data of one raster are recorded.

Let us consider a specific example that the number "n" of signal routes of the image recording apparatus is 4, viz., n=4, and that the number "m" of the heating elements 71 in each signal route is 256, viz., m=256, and therefore a total number "1" of the heating elements 71 of the thermal head is 1024. In this example, the output numbers of the gradation data 49 representing a gradation of tone of each picture element, which is read out from the RAM 46 during a period that the clock signal 69A (FIG. 5) of the 1st to m-th are generated, are shown in Table 1.

TABLE 1

| Table | Clock signal | | | |
|---|---|---|---|---|
| | 1 | 2 | ... | 256 |
| 1 | 1 | 2 | ... | 256 |
| 2 | 257 | 258 | ... | 512 |
| 3 | 513 | 514 | ... | 768 |

TABLE 1-continued

| Table | Clock signal | | | |
|---|---|---|---|---|
| | 1 | 2 | ... | 256 |
| 4 | 769 | 770 | ... | 1024 |

The gradation data 49 of 256 as read out for each signal route are inputted to the gradation to bit-train converting table. In this instance, four signal routes are employed and therefore, four gradation tables are provided in the gradation to bit-train converting table 55 (FIGS. 2 and 3). During the period of the 1st to 256th clock signal 69A, the gradation data 49 are read out of the RAM 46 by the control signal 48, and are inputted to the gradation to bit-train converting table 55. In the table, the gradation data 49 is converted into 64-bit 2-value data, and the 64-bit data is read out therefrom and loaded into the shift register 68. Remember that the gradation to bit-train converting table 52 (generally designate those tables 52-1 to 52-n) and the selector 66 are controlled by the upper and lower order signals 59 and 61 derived from the counter 57. In this instance, the upper and lower order signals 59 and 61 each consist of three bits. Every time the lower order signal 61 is counted up, the contents of the upper order signal 59 is incremented by one (+1).

In the thermal head 51, the heating element 71 is fed with a current determined by a pulse width based on the gradation. The heating element is slidably in contact with a recording medium. In case that the recording medium is, for example, an ink doner film coated with sublimation ink, the heating element contacts with the base layer of the film. Composite pulses each a combination of a number of pulses and have various pulse durations, for example, 3 ms or 5 ms, are applied to heating elements, respectively. The ink is transferred onto the recording paper in contact with the ink doner film (not shown), with its amounts corresponding to the heat energy. In this way, a gradation of tone can be expressed for each dot.

When the recording medium and/or the recording system are changed, subtle differences are observed in the recorded image, even if the same thermal head 51 is driven in a similar way. To cope with this, the differences are previously corrected by the image signal generator 41 or the gradation to bit-train converting tables 52-1 to 52-n. These tables are also used for adjusting the difference between the number of input gradations and that of the output gradations.

An inclined linear curve shown in FIG. 6 indicates a relationship between input gradation data and output gradation data when the input gradation data represents 256 gradations as is expressed fully by 8 bits, and the output data represents 64 gradations. In this case, a tone of the output gradation data is changed by one gradation every time a tone of the input gradation data changes by four gradations. To realize this relationship, the gradation to bit-train converting table has the contents as shown in FIG. 7. Figures 255 to 0 in the left end in FIG. 7 indicate gradation numbers of the input gradation data, respectively. Figures 63 to 0 in the frame indicate the number of converted gradations. To obtain the linear relationship of input data vs. output data, four input gradations are converted into one output gradation by rote.

Figure 8:
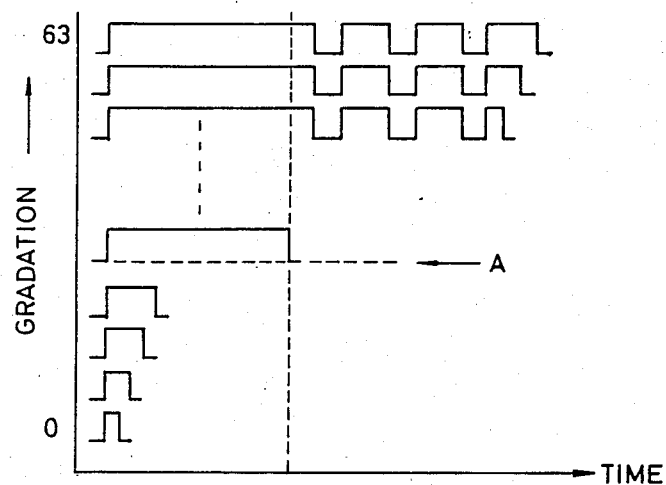
FIG. 8 is a set of waveforms of pulse signals to a thermal head, the illustration explaining how pulses contained in the gradation data whose gradation exceeds a threshold gradation are omitted.

During the above gradation control, when a heating temperature of one heating element 71 exceeds a predetermined temperature, that is to say, a heating temperature of the heating element 71 exceeds a predetermined temperature in order to make an image record at a high gray level, a heat color-developing sheet used would be thermally deformed. The deformed sheet would have a nonrecorded portion or portions in a image recorded thereon. To cope with this, the present embodiment uses a threshold gradation up to which no deformation of the heat color-developing sheet would occur. When the image recording apparatus receives the gradation data 49 representing a gradation above the threshold the gradation, the contents of the gradation to bit-train converting tables 52-1 to 52-n are designed such that a continuous pulse pattern of such gradation data 49, which is outputted from a corresponding shift register of those 68-1 to 68-n, is made discontinuous, as shown in FIG. 8. More specifically, with 64 gradations of tone, the contents of the gradation to bit-train converting tables 52-1 to 52-n are set up such that the gradation data 49 representing those gradations in excess of the threshold gradation are so processed that the pulses representative of "1" constituting the data are thinned out at appropriate intervals. In the case of the gradation data of the 64th gradation at the highest gradation, two pulses of "1" are omitted every four pulses.

Each shift register 68-1 to 68-n converts the gradation data thus obtained into a train of pulses which are time sequentially arrayed. Relationships between gradations and the pulse train are as shown in FIG. 8.

Figure 10:
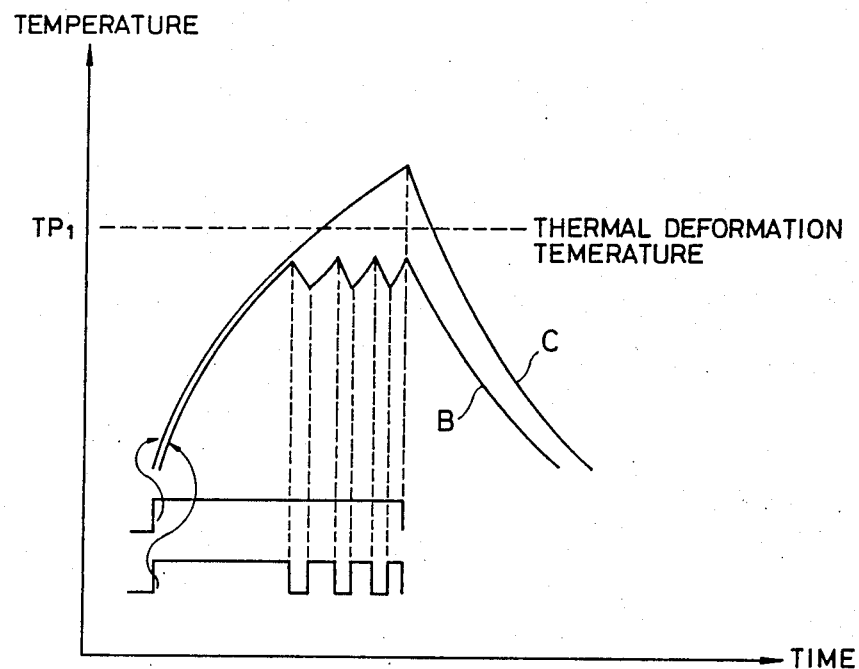
FIG. 10 is a graph comparatively showing variations of temperature of a heating element with time when the gradation data is subjected to the intermittent pulse omission process and it is not subjected to such.

The pulse signal whose "1" pulses are intermittently omitted is applied to each heating element 71 of the thermal head 51. In this case, a heating temperature of the heating element 71 varies with respect to time as indicated by a solid line B in FIG. 10. The curve B indicates that a natural heat radiating state and a heating state are alternately repeated during the discontinuous period. In FIG. 10, a curve C of solid line indicates a temperature variation of the heating element when a pulse signal is applied to the heating element continuously, not intermittently. The curve C exceeds thermal deformation temperature TP1. It is noted that the curve B zigzags below the thermal deformation temperature TP1 during the discontinuous period, and falls off at the termination of the applied pulse signal. The curve B explicitly shows that an image at a high gradation of tone can be recorded perfectly, not attendant with the partial omission of the recorded image.

Incidentally, when the pulses making up the pulse signal applied to the heating element are thinned out, the final pulse of those time sequentially arrayed pulses is preferably left as it is. If the final pulse is omitted, a tone given by the gradation data cannot be distinguished from that by the gradation data one gradation lower than the former. This hinders an exact image recording.

Figure 11:
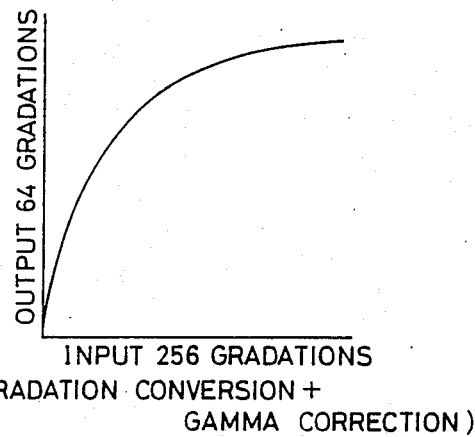
FIG. 11 is a graph showing an input gradation vs. output gradation characteristic curve after a gamma ($\gamma$) correction is applied.

To obtain a gamma (γ) correction of the characteristic of the recording medium, the stored data (expressed in terms of bit-train) in the gradation to bit-train converting tables 52 1 to 52-n are set up such that a relationship between the input gradation data and the output gradation data for the thermal head 51 is as shown in FIG. 11, and that the pulses making up the gradation data in excess of the threshold gradation may be intermittently omitted for preventing the thermal deformation of the recording medium.

Further, the gradation to bit-train converting tables may be provided respectively for the heat color-developing sheets with different heat deformation temperatures, if necessary. In this case, a user selects one of those tables in accordance with the type of the heat color-developing sheet used, and sets the selected table in the image recording apparatus.

Additionally, a single gradation to bit-train converting table may replace the plurality of gradation to bit-train converting tables 52-1 to 52-n, which are provided respectively for the divided blocks of the thermal head 51.

Figure 12:
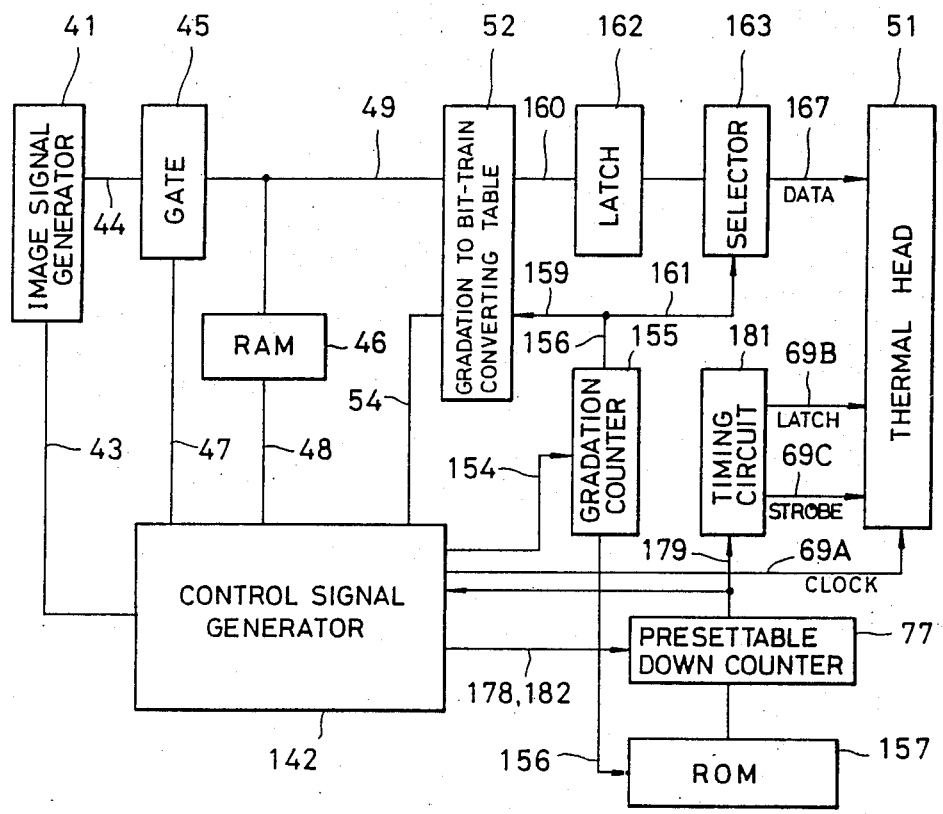
FIG. 12 is a block diagram showing another embodiment of an image recording apparatus according to the present invention.
Figure 17:
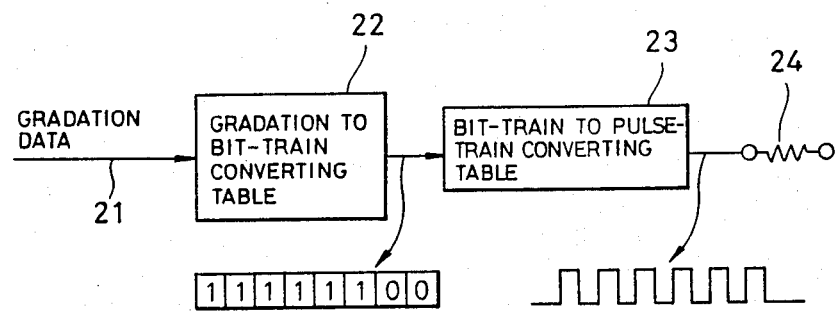
FIG. 17 is a block diagram for explaining a function of a conventional image recording apparatus.

FIG. 12 shows a block diagram of an image recording apparatus according to another embodiment of the present invention. The second embodiment is so arranged as to vary the time duration of a pulse signal applied to the a heating element. The arrangements of an image signal generator 41, gate 45, RAM 46, and gradation to bit-train converting table 52 are substantially the same as those of the embodiment of FIG. 1. Therefore, only differences between them will be described here.

Before gradation data 49 is read out from the RAM 46, a control signal generator 142 applies a reset signal as one of the control signals 154 to a gradation counter 155, and resets the counter. Then, the generator 142 generates a clock signal also as one of the control signals 154, at a predetermined timing, and starts the counting operation of the gradation counter 155. A count signal 156 representative of a count of the counter is applied to a ROM (read only memory) 157. The count signal 156 is also divided into two signals, an upper order signal 159 representative of the upper order part (upper order bits) of the count value and a lower order signal 161 representative of the lower part (lower order bits).

The upper order signal 159 is applied to the gradation to bit-train converting table 52, and specifies a storage location in the table to read out the data consisting a train of bits time sequentially arrayed, byte by byte. When the upper order signal 159 is in a logical state of "0", for example, the signal 159 specifies the 1st byte "byte 1" in the gradation to bit-train converting table 52.

Figure 13:
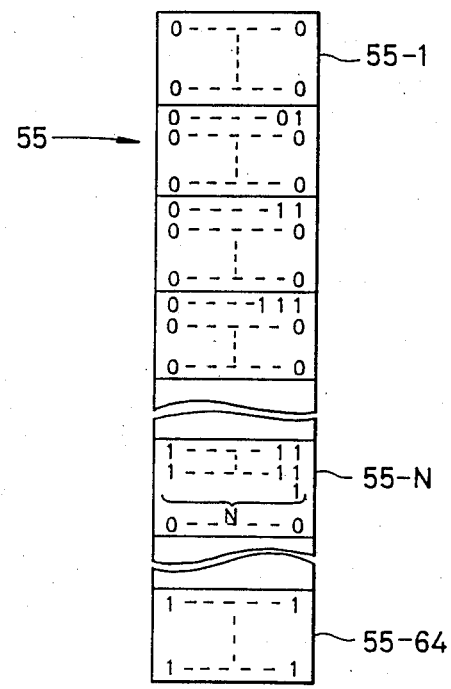
FIG. 13 shows a gradation to bit-train converting table used in the circuit arrangement of FIG. 12.

FIG. 13 shows an array of gradation tables 55-1 to 5564 making up a table map of the gradation to bit-train converting table 52, when the output gradation data represents 64 gradations. The gradation data 49 specifies one of the gradation tables 55-1 to 55-n, from which the bit-train data of gradation is read out. When the gradation data 49 for a specific picture element read out from the RAM 46 is the address data representing the 1st gradation, for example, and the upper order signal 159 is the address data of all "0's", the 1st gradation table 55-1 shown in FIG. 13 is specified, and the 1st byte "byte 1" is read out from the specified table. The gradation counter 155 is a counter of 6 bits=64 count. Since the gradation table 55 consists of 8 bytes=64 bits, the lower order signal 161 of the 3 lower order bits indicate the bit, while the upper order signal 159 of the 3 upper order bits indicate the byte. The upper order signal 159 is incremented by one (+1), every time the low order signal 161 is carried (the count of the 3 lower order bits changes from "111" to "000").

Data 160 each consisting of one byte, which correspond to the gradation data of one raster read out of the gradation to bit-train converting table 52, are retained in a latch circuit 162. The data from the latch circuit is selected by a selector 163. When the lower order signal 161 is incremented by one, the one-byte data 160 are read out byte by byte in parallel and each read out bit by bit. When the +1 incremental operation of the lower order signal 161 is repeated eight times, the one byte data 160 are read out byte by byte in parallel eight times (8 bits). When the one-byte data 160 corresponding to the gradation data of one raster are read out eight times, the upper order signal 159 is incremented by one, and hence a value of the data for accessing the gradation table 55 is incremented by one.

In this way, the one-byte data 160 corresponding to the gradation data of one raster as read out from the gradation to bit-train converting table 52, are selected by the selector 163, with the aid of the latch circuit 162, and are applied as selected data 67 to the thermal head 51. Subsequently, the gradation data 49 of one raster are read out in a predetermined sequence, the predetermined one-byte data are read out from the gradation to bit-train converting table, and the next one bit in each byte is selected by a count of the lower order signal 161, and the selected one is transferred to the thermal head 51.

Figure 9:
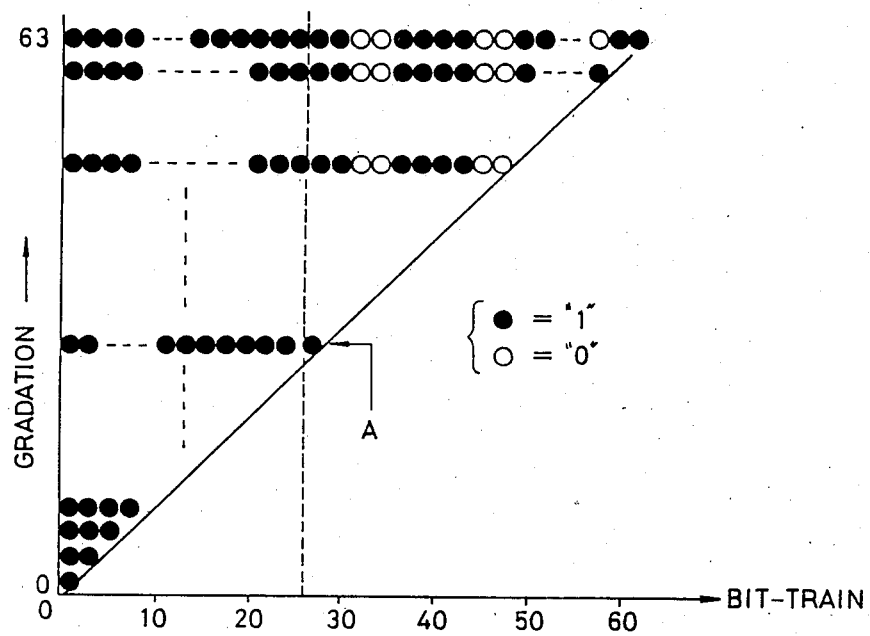
FIG. 9 is a diagram showing the contents of the gradation to bit-train converting table storing the gradation data indicating a gradation in excess of the threshold gradation.

Also in this instance, the contents of the gradation to bit-train converting table 52 are set up such that for the gradation data exceeding the threshold gradation A, their bit patterns are each partially discontinuous as shown in FIG. 9.

The configuration of the thermal head 51 is exactly the same as that of the thermal head illustrated in FIG. 4. Therefore, it is provided with "n" shift registers 68-1 to 68-n to which selected data 167 are supplied through "n" signal routes, respectively. In this respect, it may be interpreted that the selector 163 shown in FIG. 12 selects the data transferring through the individual signal routes in parallel, and that the gradation to bit-train converting table 52, latch circuit 162 and selector 163 are respectively made of the same number of the corresponding If the image recording apparatus uses the same number of those circuit blocks as that of the signal routes, it is necessary to determine the signal routes to which the gradation data 49 read out of the RAM 46 belong, and assigns them respectively to the "n" gradation to bit-train converting tables 52. Such a function may be realized if the control signal generator 142, which recognizes correspondence between the shift registers 68-1 to 68-n and the gradation data 49 for the picture elements, outputs a select signal 54 to properly select the "n" gradation to bit-train converting tables 52.

A clock signal 69A (FIG. 14(b)) generated by the control signal generator 142 is applied to the shift registers 68-1 to 68-n in the thermal head. The selected data 167 (FIG. 14(a)) is transferred bit by bit to the shift registers in synchronism with the clock signal, so that the selected data of "m" equal to the number as the product of dividing a total number of heating elements 71 of the thermal head 51 by the number "n" of the signal routes, are set in the shift registers 68-1 to 68-n. The shift registers each convert the selected data into parallel data, which in turn are applied to a latch driver 73. In response to a latch signal 69B (FIG. 14(c)), the latch driver 73 latches the parallel data. The latched data are fed to the heating elements 71 under control of a strobe signal 69C (FIG. 14(d)). Specifically, a portion of "1" in the selected data 167 feeds a current to the heating element 71 for a predetermined period of time, so that the heating element converts the electric energy into a corresponding amount of heat energy.

In this way, the heat energy is controlled for each picture element. 64 times replacements of data for the latch drive 73 are performed. Such a sequence of operations is repeated to complete the recording operation of the gradation data of one raster.

Description to follow is elaboration of forming of the latch signal 69B and strobe signal 69C, and the image recording operation by using these signals. The ROM 157 receives the count signal 156 representing a count of the gradation counter 155, as already stated. In the apparatus, like the image recording apparatus, in which a tone of an image is expressed by 64 gradations, the counter counts to produce the count signals 156 respectively representing 64 gradations from "0" to "63" in successive order.

In the ROM 157, a time duration of the pulse applied to the heating element is determined, with the count signal 156 as the address data. When the count signal 156 is "0", the data read out of the ROM 157 is the data containing a pulse with a relatively long pulse width in order to cause the heating element 71 to provide a reference temperature just below a temperature to make a record of image. When the ROM is addressed by the count signal 156 of "1", the ROM produces the data containing a pulse of such a pulse width as to cause the heating element 71 to provide a temperature gray) when a predetermined pulse width is added to the pulse width for the "0" count signal 156. Likewise when the count signal 156 is "63", the ROM produces a pulse of such a pulse width as to cause the heating element 71 to provide a temperature allowing record of an image in the highest gray level when a pulse width is added to the sum of the pulse widths for the "0" to "62" count signals 156.

FIG. 15 shows content of the ROM 157 as functioned above. If the number of gradations in gray level is "n", address data ADDRESS of "0" to "n−1" are provided for the ROM 157. Numerical data representing the time durations of applied pulses for the respective recording operations, are stored in the memory locations of the ROM.

Before the 64 different recording operations for one-raster recording of image, a presettable down counter 177 is cleared by a clear signal 178 from the control signal generator 142, and receives the data representing a pulse width from the ROM 157, and presets it therein. At this time, the counter 177 produces a control signal 179 for transmission for a timing circuit 181. Upon receipt of the control signal 179, the timing circuit 181 generates a pulse signal of a predetermined pulse width, and applies it as the latch signal 69B to the thermal head 51. In response to this latch signal 69B, the latch driver 73 latches the data of one raster therein. At a predetermined timing after the latch signal 69B is outputted, the strobe signal 69C is generated by the timing circuit 181.

The control signal 179 is also applied to the control signal generator 142. Substantially at an instant that the strobe signal 69C has risen, a clock signal 182 is outputted from the control signal generator 142. By the clock signal 182, the presettable down counter 177 counts down the preset data. When the count of the counter is zero, the counter produces the control signal 179. Upon receipt of the control signal 179, the timing circuit 181 terminates the strobe signal 69C. The control signal generator 142 detects this time point by the control signal 179, and generates the clear signal 178. Subsequently, the control of the remaining applied pulses are progressively performed in a similar way.

As seen from the foregoing description, in the image recording apparatus according to the second embodiment, for the gradation data in excess of the threshold gradation A, the pulse signal applied to the heating element 71 is partially discontinuous in waveshape, and the time duration of the strobe signal is increased with time. With this feature, the heat color-developing sheet will not be deformed for the image recording at a high gradation above the threshold gradation A. Further, a heating time of the heating element 71 can be varied with time by controlling a time duration of the strobe signal. Therefore, a tone or gray level of an image can be expressed in discrete steps of gradation by using a relatively small number of pulses. Additionally, the feature makes easy a minute adjustment of the gray level and the gamma ($\gamma$) correction.

As described above, in an image recording apparatus according to the present invention, for the image recording in a high gray level exceeding a threshold gradation, a pulse signal applied to a heating element is partially discontinuous in waveshape. This feature holds back a temperature rise of the heating element below a thermal deformation temperature of a heat color-developing sheet. Accordingly, even in the case of the image recording in a high tone exceeding the threshold gradation, no deformation will occur in the heat color-developing sheet. Consequently, a high quality image can be obtained, while being free from the partial omission of an image due to the deformation of the sheet. Another feature of an image recording apparatus according to the present invention resides in that a heating time of the heating element 51 can be varied with time by controlling a time width of a strobe signal, and hence a tone of the image can be varied with the time varying pulse width of the strobe pulse. Because of this feature, a discrete change of a tone of the image can be made with a relatively small number of pulses and in a simple manner. Further, the gamma ($\gamma$) correction can readily be applied to the image.

Having described specific embodiments of our bearing, it should be understood that the present invention may variously be changed and modified within the spirit and scope as set forth in the appended claims. It is further understood that the variations and modifications within the equivalents of the invention as defined in the claims are also within the spirit and scope of the invention.

What is claimed is:

1. An image recording apparatus for recording a halftone image by controlling a heat energy of a heating element provided corresponding to each picture element by a number of pulses based on gradation data representing a gradation within each picture element for an image, the image recording apparatus comprising:

gradation to bit-train converting means for converting the gradation data into a train of bits corresponding to the gradation data and, when receiving gradation data indicative of a gradation in excess of a predetermined gradation, for converting the gradation data into a train of bits whose bit pattern is discontinuous subsequent to outputting of a train of bits corresponding to the predetermined gradation; and bit-train to pulse-train converting means for converting the converted and outputted bit-train into a train of pulses time sequentially arrayed, and applying the converted pulse train to the heating element provided corresponding to the picture element.

2. An image recording apparatus for recording a halftone image by controlling a heat energy of a heating element provided corresponding to each picture element by a number of pulses based on gradation data representing a gradation within each picture element for an image, the image recording apparatus comprising:

gradation to bit-train converting means for converting the gradation data into a train of bits corresponding to the gradation data and, when receiving gradation data indicative of a gradation in excess of a predetermined gradation, for converting the gradation data into a train of bits whose bit pattern is discontinuous subsequent to outputting of a train of bits corresponding to the predetermined gradation; and bit-train to pulse-train converting means for converting the converted and outputted bit-train into a train of pulses time sequentially arrayed, varying a time width of the pulse train signal in accordance with each gradation, and applying the pulse train signal of a varied time width to the heating element provided corresponding to the picture element.

3. An image recording apparatus for recording a halftone image by controlling a heat energy of a heating element provided corresponding to each picture element by a number of pulses based on gradation data representing a gradation within each picture element for an image, the image recording apparatus comprising:

gradation to bit-train converting means for converting the gradation data into a train of bits corresponding to the gradation data and, when receiving gradation data indicative of a gradation in excess of a predetermined gradation, for thinning out bits in the bit-train subsequent to outputting of the train of bits corresponding to the predetermined gradation; and bit-train to pulse-train converting means for converting the converted and outputted bit-train into a train of pulses time sequentially arrayed, and applying the pulse train signal of a varied time width to the heating element provided corresponding to the picture element.

4. An image recording apparatus for recording a halftone image by controlling a heat energy of a heating element provided corresponding to each picture element by a number of pulses based on gradation data representing a gradation within each picture element for an image, the image recording apparatus comprising:

gradation to bit-train converting means for converting the gradation data into a train of bits corresponding to the gradation data and, when receiving gradation data indicative of a gradation in excess of a predetermined gradation, for thinning out bits in the bit-train subsequent to outputting of the train of bits corresponding to the predetermined gradation; and bit-train to pulse-train converting means for converting the converted and outputted bit-train into a train of pulses time sequentially arrayed, varying a time width of the pulse train signal in accordance with each gradation, and applying the pulse train signal of a varied time width to the heating element provided corresponding to the picture element.

5. The apparatus according to claim 3 or 4, wherein when receiving the gradation data indicative of a gradation in excess of the predetermined gradation, subsequent to outputting of the train of bits corresponding to the predetermined gradation, the gradation bit-train converting means thins out bits in the bit-train except the bit-train at the last output time point.

6. An image recording apparatus for recording a halftone image by controlling a heat energy of a heating element provided corresponding to each picture element by a number of pulses based on gradation data representing a gradation within each picture element for an image, the image recording apparatus comprising:

gradation to bit-train converting means including data fetching means for fetching the gradation data for each predetermined amount of data, data storing means for restoring bit-train data corresponding to the gradation data, data read means for reading out the corresponding bit-train data from the data storing means, and select means for selecting data of a desired bit-train from among the bit-train data as read out; and bit-train pulse-train converting means for converting the converted and outputted bit-train into a train of pulses time sequentially arrayed, and applying the pulse train signal of a varied time width to the heating element provided corresponding to the picture element.

7. An image recording apparatus for recording a halftone image by controlling a heat energy of a heating element provided corresponding to each picture element by a number of pulses based on gradation data representing a gradation within each picture element for an image, the image recording apparatus comprising:

gradation to bit-train converting means including data fetching means for fetching the gradation data for each predetermined amount of data, data storing means for restoring bit-train data corresponding to the gradation data, data read means for reading out the corresponding bit-train data from the data storing means, and select means for selecting data of a desired bit-train from the bit-train data as read out; and bit-train pulse-train converting means for converting the converted and outputted bit-train into a train of pulses time sequentially arrayed, varying a time width of the pulse train signal in accordance with each gradation, and applying the pulse train signal of a varied time width to the heating element provided corresponding to the picture element.

8. The apparatus according to claim 6 or 7, wherein the data fetching means includes a gate for fetching the gradation data of one raster.

9. The apparatus according to claim 6 or 7, wherein for the gradation data indicative of a gradation in excess of a predetermined gradation, the data storing means includes a gradation to bit-train converting table for storing bit-train data whose bit pattern is discontinuous subsequent to outputting of the bit-train data corresponding to the predetermined gradation.

10. The apparatus according to claim 6 or 7, wherein the data read means includes a control signal generator for generating a control signal to specify the data storing means, and a counter for specifying a predetermined amount of a predetermined bit-train data and reading out the specified data from the specified data storing means.

11. The apparatus according to claim 10, wherein the counter specifies the bit-train data for each bite, and reads out the specified bit-train data.

12. The apparatus according to claim 6 or 7, wherein the select means includes a selector which sequentially selects data bit by bit from the bit-train data read out from the data storing means and supplies the selected data bit by bit to the bit-train to pulse-train converting means.

13. The apparatus according to any one of claims 1, 2, 3 or 4, wherein the bit-train to pulse-train converting means converts the bit-train data of a discontinuous bit pattern into corresponding pulse-train data of a discontinuous pulse pattern.

14. The apparatus according to claim 13, wherein the bit-train to pulse-train converting means includes a shift register for converting serially incoming bit-train data into parallel data, and a latch driver for latching the parallel data from the shift register, converting the parallel data into a corresponding pulse signal, and applying the pulse signal to the heating element.

15. The apparatus according to claim 14, wherein when receiving bit-train data of a discontinuous bit pattern, the latch driver applies a pulse signal train of a discontinuous pulse pattern to the heating element, thereby to hold back a heat energy of the heating element below a predetermined heating temperature of the heating element.

* * * * *